(12) United States Patent
De Gersem

(10) Patent No.: US 11,116,141 B2
(45) Date of Patent: Sep. 14, 2021

(54) BALER

(71) Applicant: CNH Industrial America LLC, New Holland, PA (US)

(72) Inventor: Hans Joseph De Gersem, Oedelem (BE)

(73) Assignee: CNH Industrial America LLC, New Holland, PA (US)

( * ) Notice: Subject to any disclaimer, the term of this patent is extended or adjusted under 35 U.S.C. 154(b) by 142 days.

(21) Appl. No.: 16/503,972

(22) Filed: Jul. 5, 2019

(65) Prior Publication Data
US 2020/0008361 A1 Jan. 9, 2020

(30) Foreign Application Priority Data
Jul. 5, 2018 (BE) .............. BE2018/5474

(51) Int. Cl.
*A01F 15/12* (2006.01)
*A01F 15/14* (2006.01)
*A01F 21/00* (2006.01)
*B65B 27/12* (2006.01)

(52) U.S. Cl.
CPC ............ *A01F 15/145* (2013.01); *A01F 15/12* (2013.01); *A01F 21/00* (2013.01); *B65B 27/12* (2013.01); *Y10S 100/912* (2013.01)

(58) Field of Classification Search
CPC ...... A01F 15/12; A01F 15/141; A01F 15/145; A01F 21/00; A01F 15/0715; B65B 27/10; B65H 49/08; B65H 49/34; Y10S 100/912
USPC ........... 100/912; 242/129, 592, 594.1, 594.6, 242/596.3
See application file for complete search history.

(56) References Cited

U.S. PATENT DOCUMENTS

| 1,731,347 | A | * | 10/1929 | Milosewicz | ............ | A47F 13/04 |
| | | | | | | 242/137.1 |
| 2,989,172 | A | * | 6/1961 | Stoll | ....................... | A01F 15/12 |
| | | | | | | 206/409 |
| 3,214,113 | A | * | 10/1965 | Murray | .................. | B65H 49/08 |
| | | | | | | 242/129 |

(Continued)

FOREIGN PATENT DOCUMENTS

| EP | 0865721 A1 | 9/1998 |
| EP | 1121850 A1 | 8/2001 |
| EP | 1602270 A1 | 12/2005 |

OTHER PUBLICATIONS

International Search Report for BE Application No. 2018/5474 dated Apr. 4, 2019 (12 pages).

*Primary Examiner* — Jimmy T Nguyen
(74) *Attorney, Agent, or Firm* — Peter Zacharias; Patrick Sheldrake

(57) ABSTRACT

A baler including a twine box having a frame and a twine cradle. The twine cradle is for holding one or more spools of twine and is mounted to the frame. The twine cradle is movable between a loading position and an operational position, by way of an intermediate position. In the loading position, a spool of twine can be loaded into the twine cradle. In the operational position, twine is removable from the spool of twine within the twine cradle in order to tie a bale. The twine cradle is movable between the loading position and the intermediate position by a rotational movement about a pivot that defines a horizontal axis of rotation. The twine cradle is movable between the intermediate position and the operational position by a translational movement.

13 Claims, 7 Drawing Sheets

(56) References Cited

U.S. PATENT DOCUMENTS

| | | | | |
|---|---|---|---|---|
| 5,009,154 | A | * | 4/1991 | Boes ..................... A01F 15/141 100/5 |
| 5,996,307 | A | * | 12/1999 | Niemerg ............. A01F 15/0715 53/118 |
| 7,140,293 | B1 | * | 11/2006 | Rotole .................... A01F 15/12 100/34 |
| 7,478,591 | B2 | * | 1/2009 | Kendrick ................ A01F 15/12 100/3 |
| 8,925,287 | B2 | * | 1/2015 | Derscheid ........... A01F 15/0715 53/168 |
| 2007/0266865 | A1 | | 11/2007 | Kendrick |
| 2012/0012012 | A1 | | 1/2012 | Bruening |

* cited by examiner

Side view

Side view

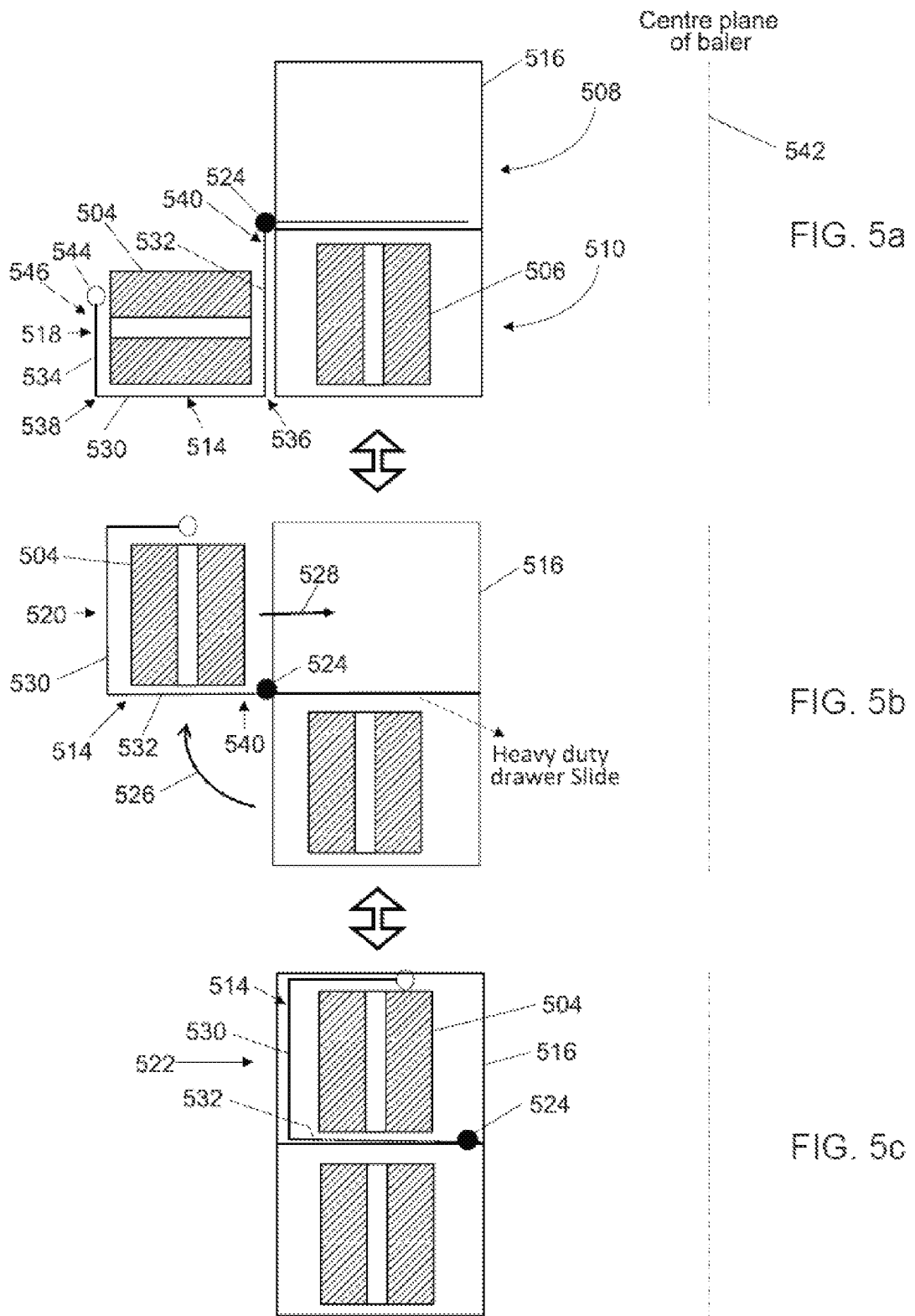

Side view

BALER

CROSS REFERENCE TO RELATED APPLICATIONS

This application claims priority to Belgium Application No. 2018/5474 filed Jul. 5, 2018, the contents of which are incorporated herein by reference.

BACKGROUND OF THE INVENTION

1. Field of the Invention

The present invention relates to an agricultural harvester, and, more particularly, to an agricultural baler.

2. Description of the Related Art

US 2012/0012012 A1 discloses a baler. The baler collects the harvested goods by means of collecting/pickup and conveying devices and supplies the collected harvested goods to a pressing device that forms the harvested goods into bales. In order to keep their shape permanently, the bales are tied by tying or binding material that is supplied to the bale from a storage container arranged on the baler that stores the tying material rolls. The storage container for the tying material rolls is pivotable from an operating position into a servicing position in order to allow access to machine parts that are covered in the operating position by the storage container. This movement can be performed preferably in a single/continuous curved path movement.

US 2012/0012012 A1 also discloses that the storage container in another embodiment is pivoted to the side about a vertical axis that is arranged on the frame of the baler and is subsequently lowered in a downward direction.

What is needed in the art is an effective mechanism and method for loading twine in a baler.

SUMMARY OF THE INVENTION

According to a first embodiment of the invention there is provided a baler including a twine box, wherein the twine box has a frame and a twine cradle. The twine cradle is for holding one or more spools of twine and is mounted to the frame. The twine cradle is movable between a loading position and an operational position, via an intermediate position. In the loading position, a spool of twine can be loaded into the twine cradle. In the operational position, twine can be removed from a spool of twine within the twine cradle in order to tie a bale. The twine cradle is movable between the loading position and the intermediate position by a rotational movement about a pivot that defines a horizontal axis of rotation. The twine cradle is movable between the intermediate position and the operational position by a translational movement.

Such a baler can provide a convenient and safe mechanism for an operator to load spools of twine into the twine box. Also, using a pivot that defines a horizontal axis of rotation can result in only a modest amount of free space being required to the side of the baler when lowering the twine cradle, which can reduce the requirements of any hinges or other mechanisms that are used to provide the pivot, and may not require a stop or a lock to control the range of motion of the twine cradle.

The twine cradle is movable between the loading position and the intermediate position without any significant translational movement. The twine cradle is movable between the intermediate position and the operational position without any significant rotational movement.

The twine cradle may be configured to accommodate a plurality of spools of twine. The twine cradle may accommodate 2, 3 4, 5, or 6 spools of twine.

The twine cradle includes an end wall and a first side wall. The first side wall extends transversely from a first edge of the end wall. The end wall is configured to support the weight of a spool of twine in the twine cradle, when the twine cradle is in the loading position. The first side wall supports the weight of a spool of twine in the twine cradle, when the twine cradle is in the intermediate position and the operational position.

A distal end of the first side wall (that is distal from the end wall) is connected to the pivot such that the twine cradle is rotatable around the pivot as the twine cradle moves between the loading position and the intermediate position. The pivot is configured to be in a generally fixed position with respect to the frame as the twine cradle moves between the loading position and the intermediate position. The twine cradle is movable upwards from the loading position to the intermediate position by the rotational movement about the pivot. The twine cradle may be movable downwards from the intermediate position to the loading position by the rotational movement about the pivot. The twine cradle may be movable by about 90 degrees between the loading position and the intermediate position.

The distal end of the first side wall is configured to be in a generally fixed position with respect to the pivot as the twine cradle moves between the intermediate position and the operational position. The pivot is movable with respect to the frame as the twine cradle moves between the intermediate position and the operational position. The pivot/twine cradle may be movable closer to a center plane of the baler as the twine cradle is movable from the intermediate position to the operational position. The twine cradle is movable inwards from the intermediate position to the operational position by the translational movement. The twine cradle may be movable outwards from the operational position to the intermediate position by the translational movement.

When the twine cradle is in the loading position it may be closer to the ground/base of the baler than when it is in the intermediate position and the operational position.

The twine cradle may include twine-guidance-means for communicating twine from a spool of twine in the twine cradle to a knotter system of the baler, when in use.

The twine cradle may include a second side wall that extends transversely from a second edge of the end wall. The first and second edges of the end wall may be opposing edges. The twine-guidance-means may comprise an eyelet. The eyelet may be associated with a distal end of the second side wall of the twine cradle.

The baler may include a twine tray, which may include an upper twine tray and a lower twine tray. The twine tray(s) may be configured to: accommodate a plurality of spools of twine, which may be spaced apart in a longitudinal direction of the baler; and provide twine to a knotter system of the baler. One or more twine cradles, in the operational position, may define at least part of one or more of the twine trays. A plurality of twine cradles may be spaced apart in a longitudinal direction of the baler.

A twine tray may comprise a plurality of twine cradles of different sizes; that is, twine cradles that accommodate different numbers of twine spools. A single twine cradle can accommodate twine spools from a plurality of different twine-spool-groups, and can have a plurality of twine-guidance-means or devices.

The twine cradle may be manually movable between the loading position and the operational position, via the intermediate position.

There may be provided a method of loading a twine box of a baler, the method including the steps of moving a twine cradle from an operational position to an intermediate position by a translational movement; moving the twine cradle from the intermediate position to a loading position by a rotational movement; loading a spool of twine into the twine cradle; moving the twine cradle from the loading position to the intermediate position by a rotational movement; and moving the twine cradle from the intermediate position to the operational position by a translational movement.

The loading step may comprise loading a plurality of spools of twine into the twine cradle, and optionally connecting the twine from two or more of the plurality of spools of twine together while the twine cradle is in the loading position.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

There now follows a description of preferred embodiments of the invention, by way of non-limiting example, with reference being made to the accompanying drawings in which:

FIG. 5a shows a schematic cross-sectional view, from the front of the baler, of the twine box of FIG. 4;

FIG. 5b is another schematic cross-sectional view, from the front of the baler, of the twine box of FIG. 4;

FIG. 5c is yet another schematic cross-sectional view, from the front of the baler, of the twine box of FIG. 4;

FIG. 6b shows schematically how twine spools can be loaded into the twine box of FIG. 6a.

Corresponding reference characters indicate corresponding parts throughout the several views. The exemplification set out herein illustrate an embodiment of the invention and such exemplification is not to be construed as limiting the scope of the invention in any manner.

DETAILED DESCRIPTION OF THE INVENTION

Figure 1:
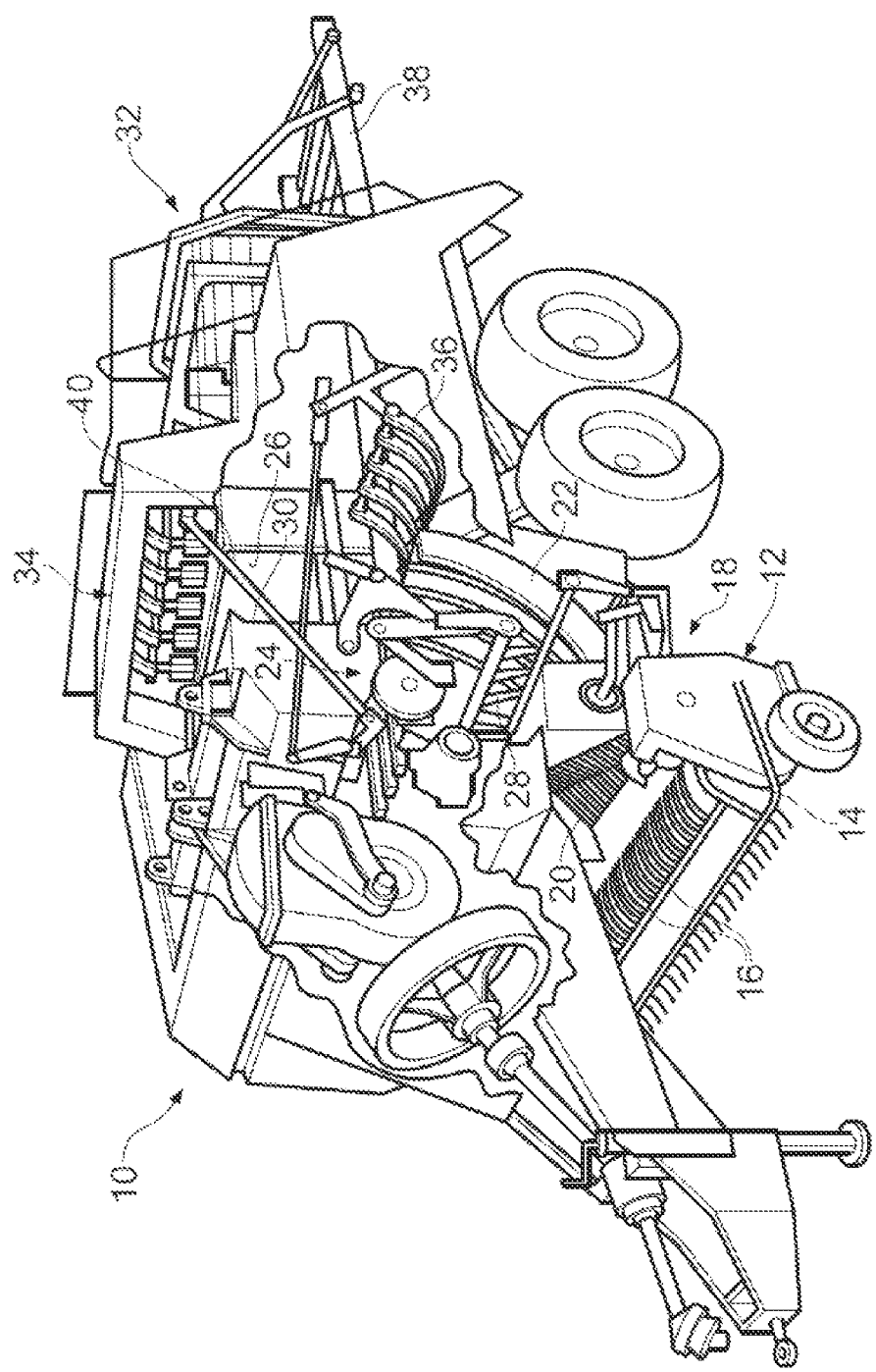
FIG. 1 shows an agricultural harvester in the form of a large square baler.

Referring now to the drawings, and more particularly to FIG. 1, there is shown an agricultural harvester in the form of a large square baler 10. FIG. 1 is a perspective cutaway view showing the internal workings of the large square baler 10. The large square baler 10 operates on a two stage feeding system. Crop material is lifted from windrows into the large square baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the rotating pickup roll 14 to move the crop material laterally inward. The packer unit 18 includes packer tines 20 which push the crop into a pre-compression chamber 22 to form a wad of crop material. The packer tines 20 intertwine the crop together and pack the crop within pre-compression chamber 22. The pre-compression chamber 22 and the packer tines 20 function as the first stage for crop compression.

Once the pressure in the pre-compression chamber 22 reaches a predetermined sensed value, a stuffer unit 24 moves the wad of crop from the pre-compression chamber 22 into an inlet end 40 of a bale chamber 26. The stuffer unit 24 includes stuffer forks 28 which thrust the wad of crop directly in front of a plunger 30, which reciprocates within the bale chamber 26 and compresses the wad of crop into a flake. The stuffer forks 28 return to their original stationary state after the wad of material has been moved into the bale chamber 26. The plunger 30 compresses the wads of crop into flakes to form a bale and, at the same time, gradually advances the bale toward an outlet end 32 of the bale chamber 26. The bale chamber 26 and plunger 30 function as the second stage for crop compression. When enough flakes have been added and the bale reaches a full (or other predetermined) size, knotters 34 are actuated which wrap and tie twine around the bale while it is still in the bale chamber 26. Needles 36 bring the lower twine up to the knotters 34 and the tying process then takes place. The twine is cut and the formed bale is ejected from a discharge chute 38 as a new bale is formed.

It will be appreciated that the examples described below can be used with different types of baler, including a packer type large square baler and a rotor type large square baler that is either standard or high density (HD).

Figure 2A:
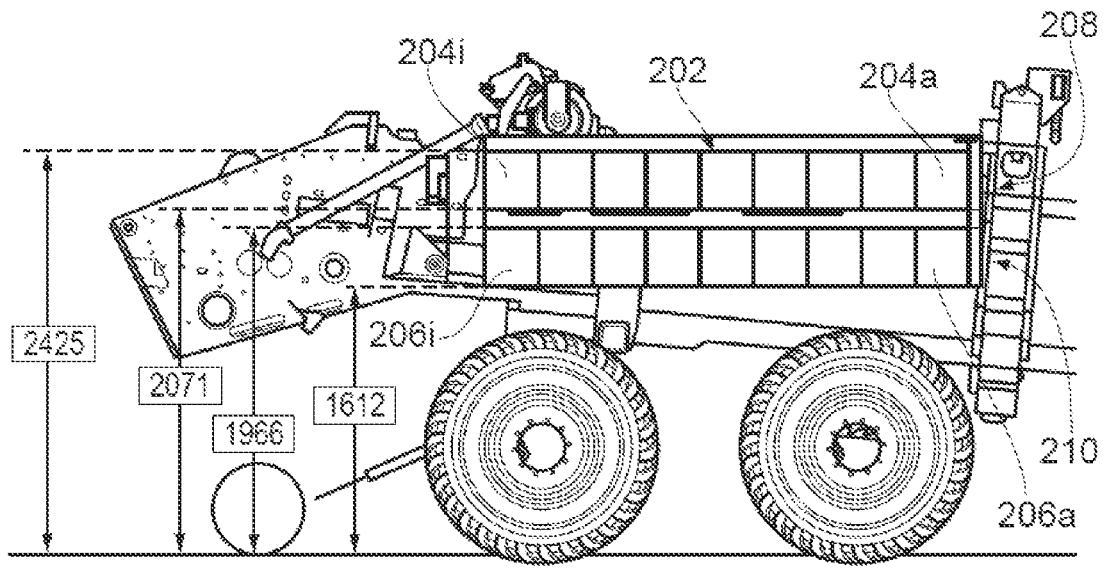
FIG. 2a shows a cutaway side view of a high density (HD) large square baler, in which a twine box is shown.
Figure 2B:
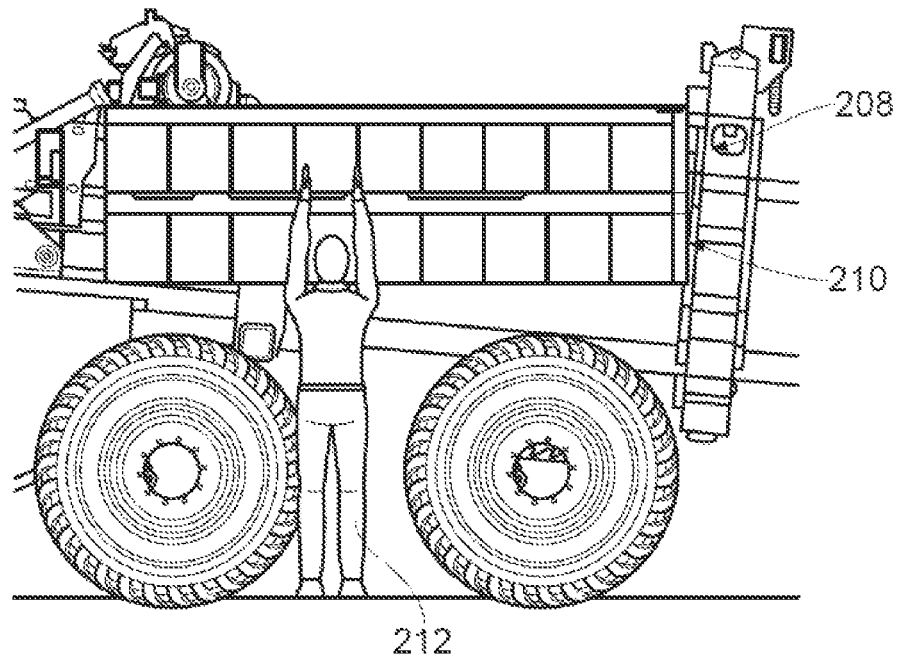
FIG. 2b is another cutaway side view of the HD large square baler, in which a twine box is shown.

FIGS. 2a and 2b show a cutaway side view of a HD large square baler, in which a twine box 202 is shown. When the baler is in use, twine box 202 can be covered by a shielding (not shown).

Twine box 202 accommodates a plurality of spools of twine. In this example there are 18 spools of twine: 9 spools of twine 204a-i are provided in an upper twine tray 208; and 9 spools of twine 206a-i are provided in a lower twine tray 210. The upper twine tray 208 is higher than the lower twine tray 210. In a lateral dimension of the baler (that is transverse to the direction of travel of the baler, and generally parallel with the ground), the upper twine tray 208 is generally in line with the lower twine tray 210. In each of the twine trays 208, 210 the spools of twine 204, 206 are spaced apart from each other in a longitudinal direction of the baler. The longitudinal direction of the baler is parallel to a direction of travel of the baler, and also parallel to the ground.

Before going into a field with a large square baler, an operator will typically make sure that the twine box 202 is fully loaded with enough twine spools 204, 206. Often, the twine spools 204, 206 are manually threaded to neighboring twine spools 204, 206 in the same twine tray 208, 210. In this way, a longer continuous piece of twine can be provided to the knotter system (not shown) of the baler from the twine box 202.

Some balers, especially HD large square balers, have twine boxes 202 that are relatively high above the ground. Various example dimensions of the twine trays 208, 210 are shown in FIG. 2a. The lower edge of the lower twine tray 210, which corresponds to a bottom surface of a spool of twine in the lower twine tray 210, is approximately 1,612 mm above the ground. A top surface of a spool of twine in the lower twine tray 210 is approximately 1,966 mm above the ground. The lower edge of the upper twine tray 208, which corresponds to a bottom surface of a spool of twine in the upper twine tray 208, is approximately 2,071 mm above the ground. A top surface of a spool of twine in the upper twine tray 208 is approximately 2,425 mm above the ground.

It is important that an operator can load the twine spools 204, 206 into the twine box 202 in a comfortable way. A twine spool may weigh about 12-13 kg, and perhaps up to 15 kg in the future. As shown in FIG. 2b, the upper twine tray 208 can be above head height of the operator 212, and the lower twine tray 210 can be at about head height of operator 212. It is dangerous for operator 212 to have to reach up (especially above his/her head) to load a twine spool 204, 206 into twine box 202.

In order to increase the comfort and safety with which operator 212 can load twine spools into twine box 202, the relative positioning between twine spools 204, 206 and operator 212 can be changed. For example, operator 212 can climb up a ladder or onto a step to increase their height above the ground. However, this can still be dangerous for operator 212. Described below are examples of how twine cradles can be moved to a loading position, which is sufficiently low such that they can be comfortably and safely loaded with twine spools 204, 206 by an operator 212 at ground level. Then the twine cradles can be moved up to an operating position, as shown in FIGS. 2a and 2b.

Figure 3:
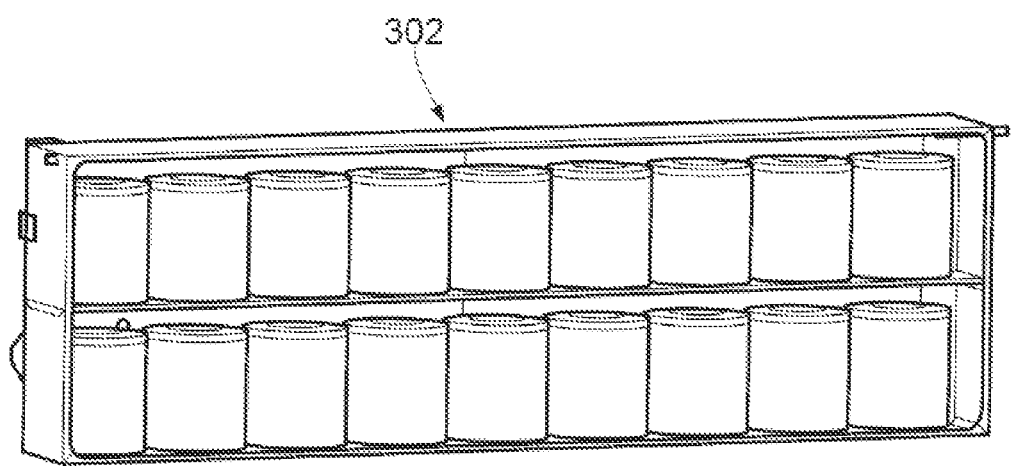
FIG. 3 shows a perspective view of the twine box, from the side of the baler.

FIG. 3 shows a perspective view of the twine box 302, from the side of the baler. In some applications, the baler can have two twine boxes 302, one on each side of the baler.

Figure 4A:
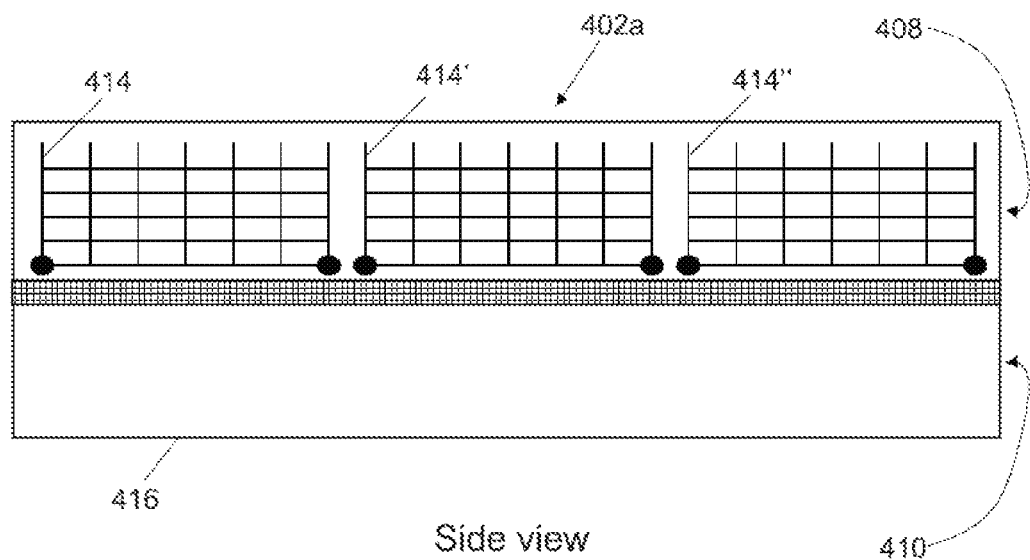
FIG. 4a shows a side view of an example embodiment of a twine box of the present invention.
Figure 4B:
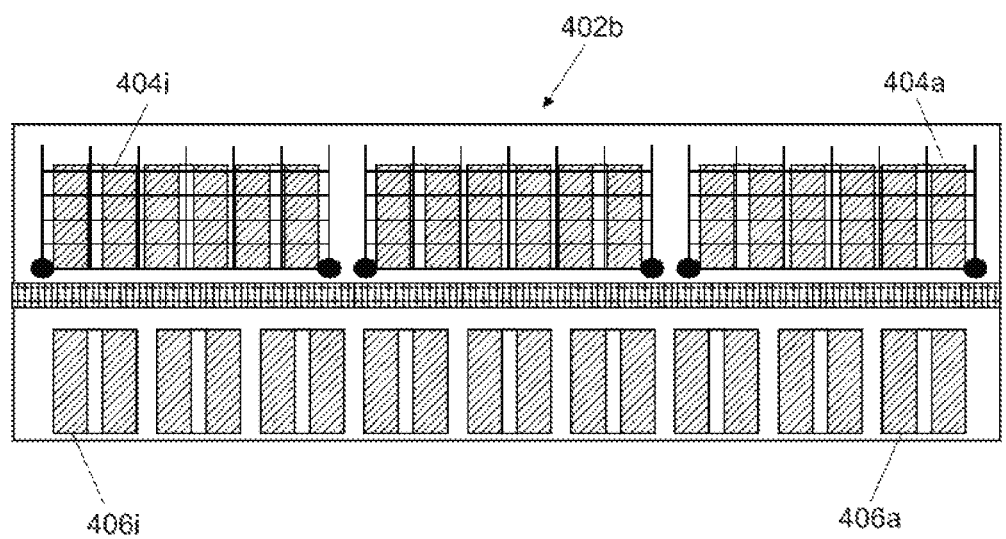
FIG. 4b shows another side view of an example embodiment of a twine box of the present invention.

FIGS. 4a and 4b show a side view of an example embodiment of a twine box 402a, 402b. FIG. 4a shows an empty twine box 402a; that is, one with no twine spools loaded in it. FIG. 4b shows a loaded twine box 402b; that is, one with twine spools 404i-404a, 406i-406a loaded in it. In this example, the twine box includes a frame 416 and three twine cradles 414, 414',414", which are mounted to frame 416. Each twine cradle defines part of an upper tray 408 of twine box 402. As shown in FIG. 4b, the twine cradles 414 are for holding one or more spools of twine 404. In this example, each twine cradle 414 holds three spools of twine 404.

Twine box 402 also includes a lower twine tray 410. In this example, the lower twine tray 410 does not include any twine cradles. However, in other examples the lower twine tray 410 may include twine cradles that are in addition to, or instead of, twine cradles 414 in the upper twine tray 408. In further examples still, a twine box may include more than two twine trays, in which case a middle twine tray may include twine cradles. This can be in addition to, or instead of, twine cradles 414 in the upper and/or lower twine trays 408, 410.

As will be discussed below, twine cradles 414 are movable between a loading position and an operational position, via an intermediate position, such that one or more spools of twine can be loaded into twine cradles 414.

FIGS. 5a to 5c show schematic cross-sectional views, from the front of the baler, of the twine box of FIG. 4. In FIG. 5a twine cradle 514 is in a loading position 518. In FIG. 5b twine cradle 514 is in an intermediate position 520. In FIG. 5c twine cradle 514 is in an operational position 522. As shown in FIGS. 5a and 5c, an operator loads a twine spool 504 horizontally into twine cradle 514 (FIG. 5a), such that the twine spool has the desired vertical orientation when it is in the operational position 522 (FIG. 5c).

The twine cradle 514 is movable between loading position 518 (as shown in FIG. 5a) and operational position 522 (as shown in FIG. 5c), via intermediate position 520 (as shown in FIG. 5b). In the loading position 518, a spool of twine 504 can be loaded into twine cradle 514. In operational position 522, twine can be removed from the spool of twine 504 that is within the twine cradle 514 in order to tie a bale.

Twine cradle 514 is movable between the loading position 518 and the intermediate position 520 by a rotational movement 526 about a pivot 524. Pivot 524 defines a horizontal axis of rotation; that is, an axis that is parallel with the floor when the baler is in an upright orientation. The axis is also parallel with the longitudinal direction of the baler.

The twine cradle 514 is movable between the intermediate position 520 and the operational position 522 by a translational movement 528. In this example the translational movement 528 is rectilinear, and it can be in a direction that is generally parallel with the ground when the baler is in an upright orientation. This direction is also transverse to the longitudinal direction of the baler. As shown in FIG. 5b, the twine cradle 514 is movable between the loading position 518 and the intermediate position 520 without any significant translational movement; and the twine cradle 514 is movable between the intermediate position 520 and the operational position 522 without any significant rotational movement. In other examples, twine cradle 514 is movable between the intermediate position 520 and the operational position 522 with some rotational movement in addition to the translational movement 528. That is, a mechanism may be used that allows or causes twine cradle 514 to rotate down or up during the sliding movement between the intermediate position 520 and the operational position 522. In this way, the twine cradle can be lifted and the twine spools 504 can be slid into the twine box.

Advantages of rotating a twine cradle about a horizontal axis (as shown in FIGS. 5a and 5b) include: Only a modest amount of free space is required to the side of the baler when lowering the twine cradle 514. For example, if the baler is parked in a building, then an operator only requires enough room on the side of the baler to open the twine box panel/shielding. Pulling the twine cradle 514 to the loading/service position of FIG. 5a may not require any extra space because it can only occupy the height of a spool and potentially some associated framework (an approximate maximum of 40 cm in some applications). Therefore, using a pivot 524 for rotation about a horizontal axis can be particularly favorable when the baler is in a workshop; whereas pivoting a whole twine box around a vertical axis would require much more space and clearance around the baler.

A twine cradle can more readily be implemented as part of a single twine tray, and does not necessarily need to accommodate twine spools that fill the entire height of the twine box (the upper and lower twine trays as they are described herein). This can result in the twine cradle being relatively short, a little more than the height of a single twine spool, such that a relatively small amount of clearance on the side of the baler is required to load twine spools into the twine box.

Hinging a twine cradle 514 horizontally may require hinges that are not as strong and robust as would be required for rotating a twine cradle about a vertical axis. Also, less deformation of the hinges/rotational mechanism and the twine cradle 514 can be expected when rotating the twine cradle 514 about a horizontal axis.

It may not be necessary to have a stop or a lock when hinging the twine 514 cradle horizontally; instead gravity can automatically control the range of motion of the twine cradle 514. In contrast, if a vertically hinged twine cradle were used, then a stop or lock may be required to prevent a twine cradle from over-rotating.

It can be convenient to split a twine tray into multiple twine cradles 514. In this way, the number of spools in a twine tray, and therefore also the associated weight of a fully loaded twine cradle 514 can be controlled such that the twine cradles can be moved between different positions by hand. In contrast, if a vertically hinged twine cradle were used, then it may be more difficult or impossible for a plurality of twine cradles to be used for a single twine tray. For instance, the mechanisms that would be required may be complicated in order to ensure that movement of one twine cradle does not foul another of the twine cradles.

In the example of FIGS. 5a-c, the twine cradle 514 includes an end wall 530, a first side wall 532, and an optional second side wall 534. The first side wall 532 extends transversely from a first edge 536 of end wall 530. The second side wall 534 extends transversely from a second edge 538 of end wall 530. The first and second edges 536, 538 of end wall 530 are opposing edges.

As shown in FIG. 5a, end wall 530 supports the weight of a spool of twine 504 in the twine cradle 514, when twine cradle 514 is in the loading position 518. That is, the spool of twine 504 is located on top of end wall 530 when twine cradle 514 is in the loading position 518. As shown in FIGS. 5b and 5c, first wall 532 is configured to support the weight of the spool of twine 504 in twine cradle 514, when twine cradle 514 is in the intermediate position 520 and the operational position 522. That is, the spool of twine 504 is located on top of the first side wall 532 when twine cradle 514 is in the intermediate position 520 and the operational position 522.

First side wall 532 has a distal end 540, which is distal from a connection to end wall 530. Distal end 540 of first side wall 532 is connected to pivot 524 such that twine cradle 514 is rotatable around pivot 524 as twine cradle 514 moves between the loading position 518 and the intermediate position 520. Pivot 524 is in a generally fixed position with respect to frame 516 as twine cradle 514 rotates between the loading position 518 and the intermediate position 520.

As shown in FIGS. 5a and 5b, in this example twine cradle 540 is rotatable by about 90 degrees between loading position 518 and intermediate position 520. In this way, twine cradle 514 is movable downwards and outwards from intermediate position 520 to loading position 518 by the rotational movement 526 about pivot 524. Similarly, twine cradle 514 is movable upwards from loading position 518 to intermediate position 520 by the rotational movement 526 about pivot 524. In this way, when twine cradle 514 is in the loading position 518 it is closer to the ground (base of the baler) than when it is in intermediate position 520 and operational position 522. When twine cradle 514 is in loading position 518 it can be at a height that is readily accessible to an operator in a safe and comfortable way. Also, in a lateral dimension of the baler, twine cradle 514 is displaced outwards from lower twine tray 510, which is shown holding twine spool 506, when twine cradle 514 is in loading position 518.

Distal end 540 of first side wall 532 is in a generally fixed position with respect to pivot 524 as twine cradle 514 moves between intermediate position 520 and operational position 522. Pivot 524 is movable with respect to frame 516 as twine cradle 514 moves between intermediate position 520 and operational position 522. For example, pivot 524 can be connected to a heavy duty drawer slide that is mounted to frame 516. In this way, pivot 524 and twine cradle 514 can move together relative to frame 516. The pivot 524/twine cradle 514 are movable closer to a center plane 542 of the baler as twine cradle 514 is movable from intermediate position 520 to operational position 522. That is, twine cradle 514 is movable inwards from intermediate position 520 to operational position 522 by the translational movement. Similarly, pivot 524/twine cradle 514 are movable further away from the center plane 542 of the baler as twine cradle 514 is movable from operational position 522 to intermediate position 520. That is, twine cradle 514 is movable outwards from operational position 522 to intermediate position 520 by the translational movement.

As indicated above, in this example twine cradle 514 also includes a second side wall 534. The second side wall 534 can be useful in ensuring that twine spool 504 stays within twine cradle 514 as it is moving between different positions. Also, second side wall 534 of FIG. 5 includes an eyelet 544 for communicating twine from the spool of twine 504 in twine cradle 514 to a knotter system (not shown) of the baler, when in use. For example, when twine cradle 514 is in loading position 518, the operator can thread the twine from a twine spool 504 through eyelet 544 such that the end of the twine can be in a predetermined position that is spaced apart from spool 504. This can advantageously assist a subsequent operation of providing the twine to the knotter system.

Furthermore, the operator can beneficially thread the twine through eyelet 544 when twine cradle 514 is at an accessibly height in loading position 518. The operator can also conveniently connect together free ends of neighboring twine spools 504 when twine cradle 514 is at an accessibly height in loading position 518.

In this example, eyelet 544 is associated with a distal end 546 of the second side wall 534 of twine cradle 514. This can be a convenient location for the knotter system in some balers. In other examples, eyelet 544 can be provided at any other location on twine cradle 514 such that it is accessible to an operator when the twine cradle is in loading position 518, and is in an appropriate position for the knotter system when twine cradle 514 is in operational position 522. Twine eyelet 544 can be integrated into twine cradle 514 as shown in the figure.

Eyelet 544 is one example of twine-guidance-means (or devices) that can be used to communicate twine from a spool of twine 504 in twine cradle 514 to a knotter system of the baler, when in use. An operator can couple twine from twine spool 504 to the twine-guidance-means when twine cradle 514 is in the loading position. In some examples, the twine-guidance-means need not necessarily have a completely enclosed shape; for example the twine-guidance-means can be provided as a notch or groove in any appropriate component or structure of twine cradle 514.

The mechanism for opening the shielding that covers the twine box can be designed such that when sliding out twine cradle 514 from operational position 522 to intermediate position 520, it does not interfere with the shielding. The shielding may need to be relatively high above the ground when it is open, and in some examples may need to be in an almost horizontal position (parallel to the ground) when it is fully open.

It will be appreciated from the description of FIGS. 4a and 4b that a twine tray can accommodate a plurality of spools of twine that are spaced apart in a longitudinal direction of the baler, and can provide twine to a knotter system of the baler. Furthermore, one or more of a plurality of twine cradles 514, in the operational position 522, can define at least part of an upper twine tray 508; and/or define at least part of a lower twine tray 510.

In the example of FIGS. 4a and 4b, each twine cradle carries 3 twine spools. In some applications this can be a good choice to cope with the total weight of twine spools 504 when opening/closing twine cradle 514. Also, as discussed above, the twines on the 3 spools in a common twine cradle 514 may be connected to each other, in order to service a single knotter. In this way, the connected twine spools can be referred to as a twine-spool-group.

In this example, twine cradle 514 is manually movable between loading position 518 and operational position 522, via intermediate position 520. On other examples, the twine cradle can include one or more actuators or biasing means for assisting with, or controlling, the movement of twine cradle 514. For example, gas struts, springs or something similar can be used.

As shown in FIGS. 4a and 4b, the walls of the twine cradle do not need to be solid walls; for example they can provided as meshes or any other tube-frame.

Figure 6A:
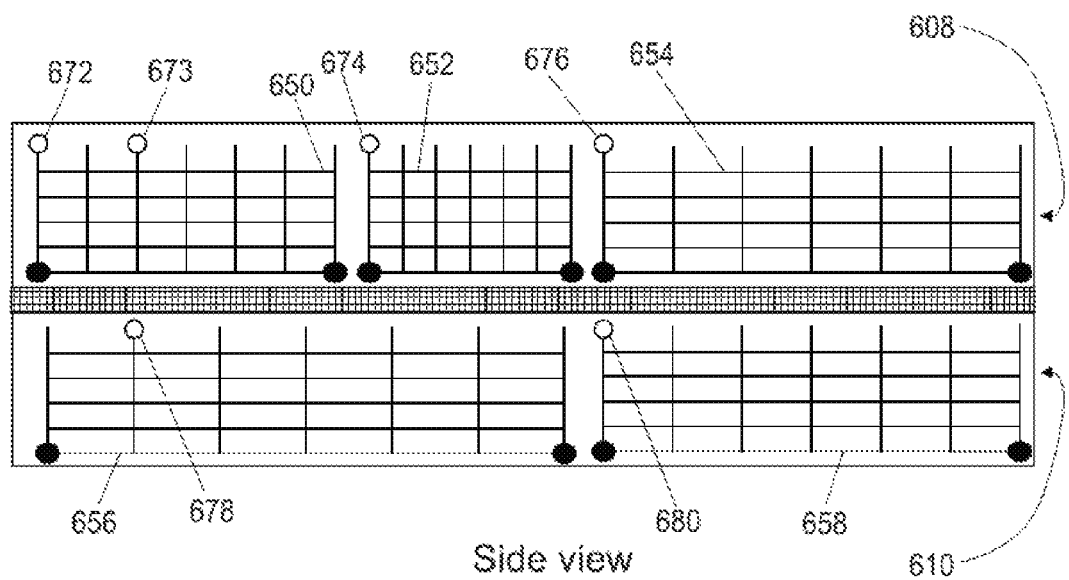
FIG. 6a shows a side view of another example embodiment of an empty twine box.
Figure 6B:
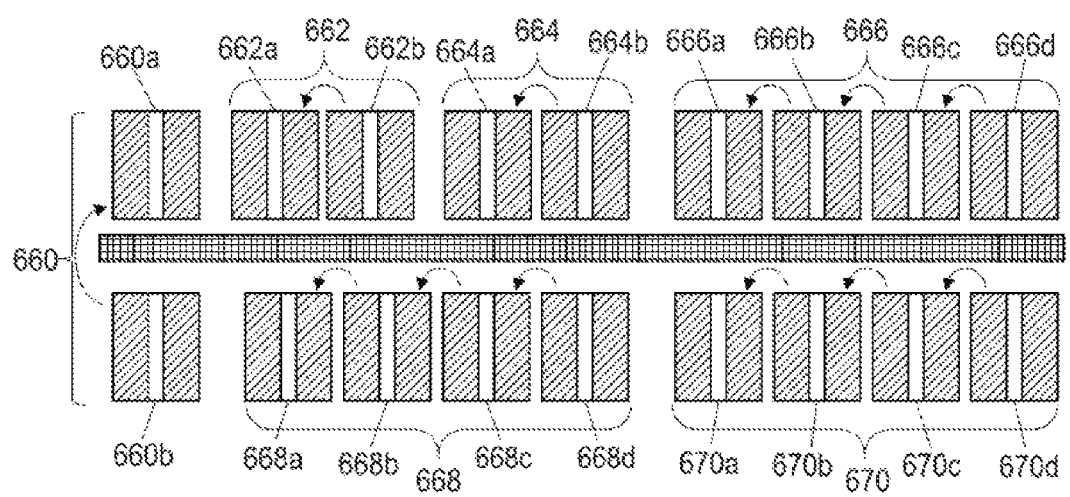

FIG. 6a shows a side view of another example embodiment of an empty twine box. FIG. 6b shows schematically how twine spools can be loaded into the twine box of FIG. 6a; and in particular how twine spools can be associated into twine-spool-groups that are tied together to supply twine to a knotter in order to define a twine routing layout. That is, a twine-spool-group comprises a plurality of twine spools that are tied together such that they can provide a continued length of twine to a knotter from the plurality of twine spools. FIG. 6a shows how a twine tray can comprise a plurality of twine cradles of different sizes; that is, twine cradles that accommodate different numbers of twine spools. FIGS. 6a and 6b together show how a single twine cradle can accommodate twine spools from a plurality of different twine-spool-groups, and can have a plurality of eyelets. Further details will be provided below.

FIG. 6a shows a twine box that has an upper twine tray 608 and a lower twine tray 610. The upper twine tray 608 includes three upper twine cradles: a first upper twine cradle 650 that can accommodate 3 twine spools; a second upper twine cradle 652 that can accommodate 2 twine spools; and a third upper twine cradle 654 that can accommodate 4 twine spools. The lower twine tray 610 includes two lower twine cradles: a first lower twine cradle 656 that can accommodate 5 twine spools; and a second lower twine cradle 658 that can accommodate 4 twine spools.

For this application, each knotter of the baler has a top slacker arm and a bottom slacker arm. Due to the way that the knotter ties twine around the bales, the top slacker arm will use about twice as much twine as the bottom slacker arm. In this example, a twine-spool-group that includes 4 twine spools tied together is used to provide twine to the top slacker arm; and a twine-spool-group that includes 2 twine spools tied together is used to provide twine to the bottom slacker arm. Therefore, 6 twine spools in total are used for a single knotter. The baler associated with the twine box of FIG. 6a has 6 knotters, and therefore the baler requires 36 twine spools. The twine box of FIG. 6a can accommodate 18 twine spools. The baler can also have a second twine box, on the opposite side of the baler, for accommodating another 8 twine spools. The second twine box may the same as the twine box of FIG. 6a.

FIG. 6b shows schematically how twine spools can be associated into twine-spool-groups for loading into the twine box of FIG. 6a. The twine cradles of FIG. 6a have been omitted from FIG. 6b in order to more clearly illustrate the twine routing layout for the twine spools.

FIG. 6b shows 6 twine-spool-groups: a first-twine-spool-group 668, which includes 4 twine spools 668a-d that are tied together (as indicated by the curved arrows between the twine spools 668a-d) for providing twine to a top slacker arm of a first knotter; a second-twine-spool-group 660, which includes 2 twine spools 660a-b that are tied together for providing twine to a bottom slacker arm of the first knotter; a third-twine-spool-group 666, which includes 4 twine spools 666a-d that are tied together for providing twine to a top slacker arm of a second knotter; a fourth-twine-spool-group 662, which includes 2 twine spools 662a-b that are tied together for providing twine to a bottom slacker arm of the second knotter; a fifth-twine-spool-group 670, which includes 4 twine spools 670a-d that are tied together for providing twine to a top slacker arm of a third knotter; and a sixth-twine-spool-group 664, which includes 2 twine spools 664a-b that are tied together for providing twine to a bottom slacker arm of the third knotter.

As can be seen from FIGS. 6a and 6b: the first upper twine cradle 650 accommodates: (i) the fourth-twine-spool-group 662; and also (ii) one of the twine spools 660a from the second-twine-spool-group 660. In this way, a twine cradle can accommodate a subset of twine spools from a twine-spool-group, optionally along with twine spools from a different twine-spool-group; the second upper twine cradle 652 accommodates the sixth-twine-spool-group 664; the third upper twine cradle 654 accommodates the third-twine-spool-group 666; the first lower twine cradle 656 accommodates: (i) the first-twine-spool-group 668; and also (ii) one of the twine spools 660b from the second-twine-spool-group 660; and the second lower twine cradle 658 accommodates the fifth-twine-spool-group 670.

The plurality of twine cradles, between them, include a twine-guidance-means for each twine-spool-group in the form of a twine-guidance device. In this example, the twine-guidance-means are implemented as eyelets. As will be discussed below, depending upon the twine layout, a twine cradle can include one or a plurality of eyelets. In other layouts, a twine cradle may not include any eyelets at all.

The twine box of FIG. 6a includes the following eyelets: a first-eyelet 678, for the first-twine-spool-group 668, which is provided on the first lower twine cradle 656. In this example the first-eyelet 678 is spaced apart (in a longitudinal dimension of the baler/twine box) from an end of the cradle 656 because the cradle also includes a twine spool 660b from a different twine-spool-group; a second-eyelet 672, for the second-twine-spool-group 660, which is provided on the first upper twine cradle 650; a third-eyelet 676, for the third-twine-spool-group 666, which is provided on the third upper twine cradle 654; a fourth-eyelet 673, for the fourth-twine-spool-group 662, which is provided on the first upper twine cradle 650. In this example, because the first upper twine cradle 650 accommodates the last twine spool 662a, 660a from 2 different twine-spool-groups 660, 662, the first upper twine cradle 650 includes 2 eyelets 672, 673. There is also included a fifth-eyelet 680, for the fifth-twine-spool-group 670, which is provided on the second lower twine cradle 658; and a sixth-eyelet 674, for the sixth-twine-spool-group 664, which is provided on the second upper twine cradle 652.

Advantageously, an operator can manually knot a twine spool to another twine spool in the same twine-spool-group when the twine cradle is in the loading position. Further still, the operator can thread the twine from the last twine spool in a twine-spool-group through the associated eyelet so that it is well positioned for connecting to the appropriate knotter system.

It will be appreciated that the layouts of FIGS. 6a and 6b are non-limiting examples, and that different layouts can be used. For instance, the upper and/or lower twine trays 608, 610 can include: (i) a 4-spool twine cradle, a 3-spool twine cradle, and a 2-spool twine cradle; or (ii) a 4-spool twine cradle, and a 5-spool twine cradle. In other examples, a twine tray 608, 610 may be sized to accommodate more or less than 9 twine spools.

In some applications it can be beneficial to design the twine layout and twine cradle layout in order to control the twine cradle weight when it is fully loaded with twine spools. The design can take into account whether or not any mechanical assistance will be provided for moving a twine cradle (such as by a gas strut or spring as mentioned above), or if a twine cradle is intended to be fully manually operable.

Figure 7:
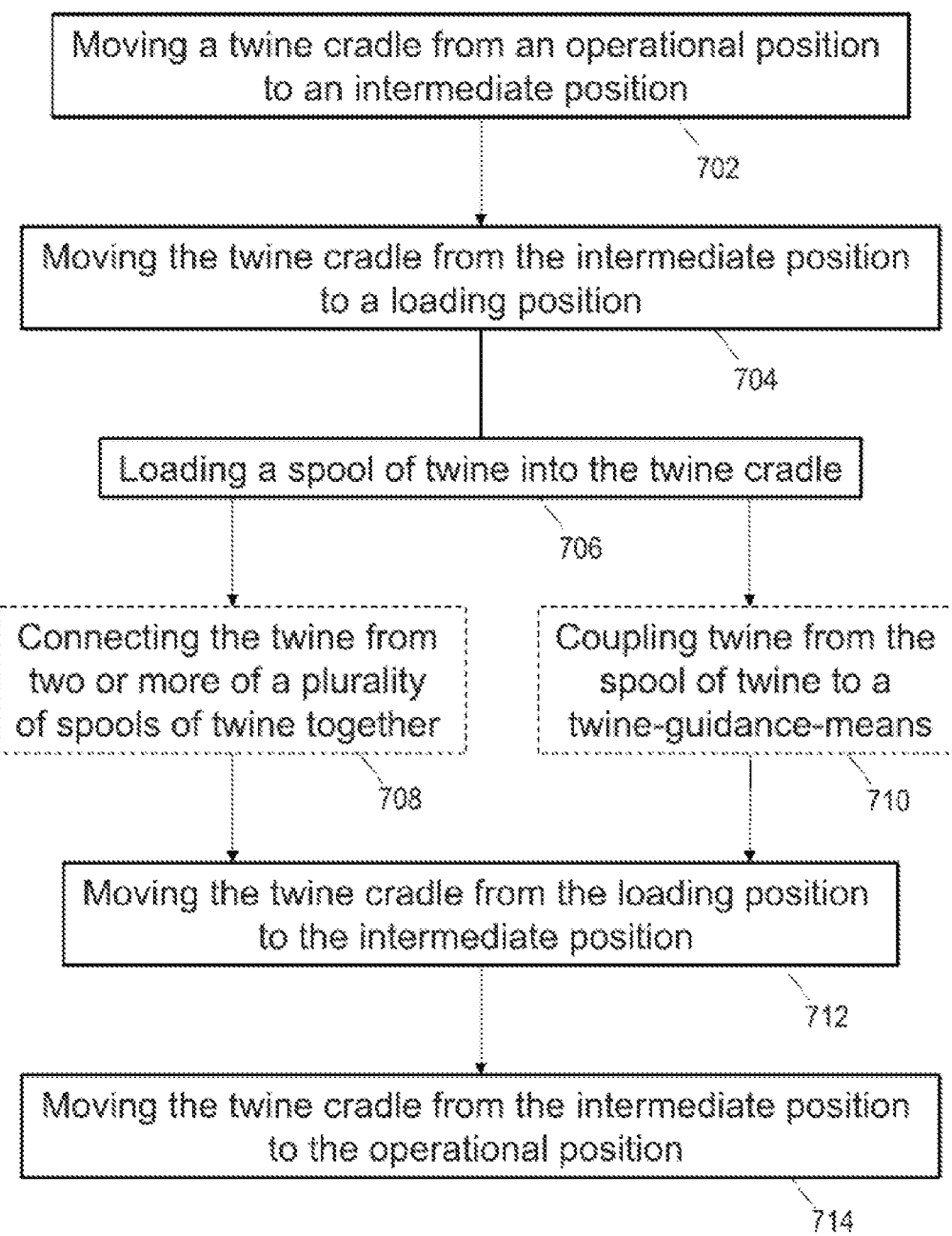
FIG. 7 schematically shows a method of loading a twine box of a baler.

FIG. 7 schematically shows a method of loading a twine box of a baler. At step 702, the method involves moving a twine cradle from an operational position to an intermediate position by a translational movement. For example, moving a twine cradle from the position of FIG. 5c to the position of FIG. 5b.

At step 704, the method involves moving the twine cradle from the intermediate position to a loading position by a rotational movement. For example, moving a twine cradle from the position of FIG. 5b to the position of FIG. 5a. In this way, the twine cradle is in a lower position than when it is in the operational position and therefore can be more conveniently and safely loaded by an operator.

At step 706, the method involves loading a spool of twine into the twine cradle. Optionally, the method can also include step 710, which involves coupling twine from the spool of twine to a twine-guidance-means (such as the eyelet of FIGS. 5a to 5c) that is associated with the twine cradle, while the twine cradle is in the loading position. Also optionally, if the loading step 706 comprises loading a plurality of spools of twine into the twine cradle, then the method can include as step 708 connecting the twine from two or more of the plurality of spools of twine together while the twine cradle is in the loading position.

The method then continues at step 712 by moving the twine cradle from the loading position to the intermediate position by a rotational movement. For example, by moving the twine cradle from the position of FIG. 5a to the position of FIG. 5b. Then the method involves moving the twine cradle from the intermediate position to the operational position by a translational movement at step 714. For example, by moving the twine cradle from the position of FIG. 5b to the position of FIG. 5c. In this way, the twine spools can be suitably located for connecting to a knotter system so that the baler is ready for use.

Throughout the present specification, the descriptors relating to relative orientation and position, such as "horizontal", "vertical", "top", "bottom" and "side", are used in the sense of the orientation of the baler as presented in the drawings. However, such descriptors are not intended to be in any way limiting to an intended use of the described or claimed invention.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A baler comprising:
   a twine box, wherein the twine box includes:
      a frame; and
      a twine cradle mounted to the frame, the twine cradle for holding one or more spools of twine;
   wherein:
      the twine cradle is movable between a loading position and an operational position, by way of an intermediate position;
      in the loading position, a spool of twine can be loaded into the twine cradle;
      in the operational position, twine is removable from the spool of twine within the twine cradle in order to tie a bale;
      the twine cradle is movable between the loading position and the intermediate position by a rotational movement about a pivot that defines a horizontal axis of rotation; and
      the twine cradle is movable between the intermediate position and the operational position by a translational movement, and
   wherein the twine cradle includes an end wall and a first side wall, wherein:
      the first side wall extends transversely from a first edge of the end wall;
      the end wall is configured to support a weight of the spool of twine in the twine cradle, when the twine cradle is in the loading position;
      the first side wall is configured to support a weight of the spool of twine in the twine cradle, when the twine cradle is in the intermediate position and the operational position;
      a distal end of the first side wall is configured to be in a generally fixed position with respect to the pivot as the twine cradle moves between the intermediate position and the operational position; and
      the pivot is configured to be movable with respect to the frame as the twine cradle moves between the intermediate position and the operational position.

2. The baler of claim 1, wherein the twine cradle is configured to accommodate a plurality of spools of twine.

3. The baler of claim 1, wherein:
   the twine cradle is movable between the loading position and the intermediate position without any significant translational movement; and
   the twine cradle is movable between the intermediate position and the operational position without any significant rotational movement.

4. The baler of claim 1, wherein the distal end of the first side wall is connected to the pivot such that the twine cradle is rotatable around the pivot as the twine cradle moves between the loading position and the intermediate position.

5. The baler of claim 1, wherein the pivot is configured to be in a generally fixed position with respect to the frame as the twine cradle moves between the loading position and the intermediate position.

6. The baler of claim 1, wherein the twine cradle is movable downwards from the intermediate position to the loading position by the rotational movement about the pivot.

7. The baler of claim 1, wherein the twine cradle is movable inwards from the intermediate position to the operational position by the translational movement.

8. The baler of claim 1, wherein the twine cradle further includes a twine-guidance device communicating the twine from the spool of twine in the twine cradle to a knotter system of the baler.

9. The baler of claim 8, wherein:
the twine cradle further includes a second side wall that extends transversely from a second edge of the end wall, wherein the first and second edges of the end wall are opposing edges; and
the twine-guidance device is associated with a distal end of the second side wall of the twine cradle.

10. The baler of claim 1, further comprising a twine tray configured to:
accommodate a plurality of spools of twine that are spaced apart in a longitudinal direction of the baler; and
provide twine to a knotter system of the baler,
wherein the twine cradle, in the operational position, defines at least part of the twine tray.

11. The baler of claim 1, further comprising a plurality of twine cradles, an upper twine tray, and a lower twine tray, wherein:
one or more of the plurality of twine cradles, in the operational position, defines at least part of the upper twine tray; and
one or more of the plurality of twine cradles, in the operational position, defines at least part of the lower twine tray.

12. The baler of claim 1, wherein the twine cradle is manually movable between the loading position and the operational position, by way of the intermediate position.

13. A method of loading a twine box of a baler, the method comprising the steps of:
moving a twine cradle from an operational position to an intermediate position by a translational movement;
moving the twine cradle from the intermediate position to a loading position by a rotational movement;
loading a spool of twine into the twine cradle;
moving the twine cradle from the loading position to the intermediate position by a rotational movement; and
moving the twine cradle from the intermediate position to the operational position by a translational movement,
wherein a distal end of a first side wall of the twine cradle is configured to be in a generally fixed position with respect to a pivot about a horizontal axis as the twine cradle moves between the intermediate position and the operational position; and
wherein the pivot is configured to be movable with respect to the frame as the twine cradle moves between the intermediate position and the operational position.

* * * * *